June 28, 1966  R. M. ROWND  3,258,147
VACUUM BOTTLES HAVING FILLERS WITH PLASTIC LINERS
Filed Aug. 20, 1964  4 Sheets-Sheet 1
FIG. 1
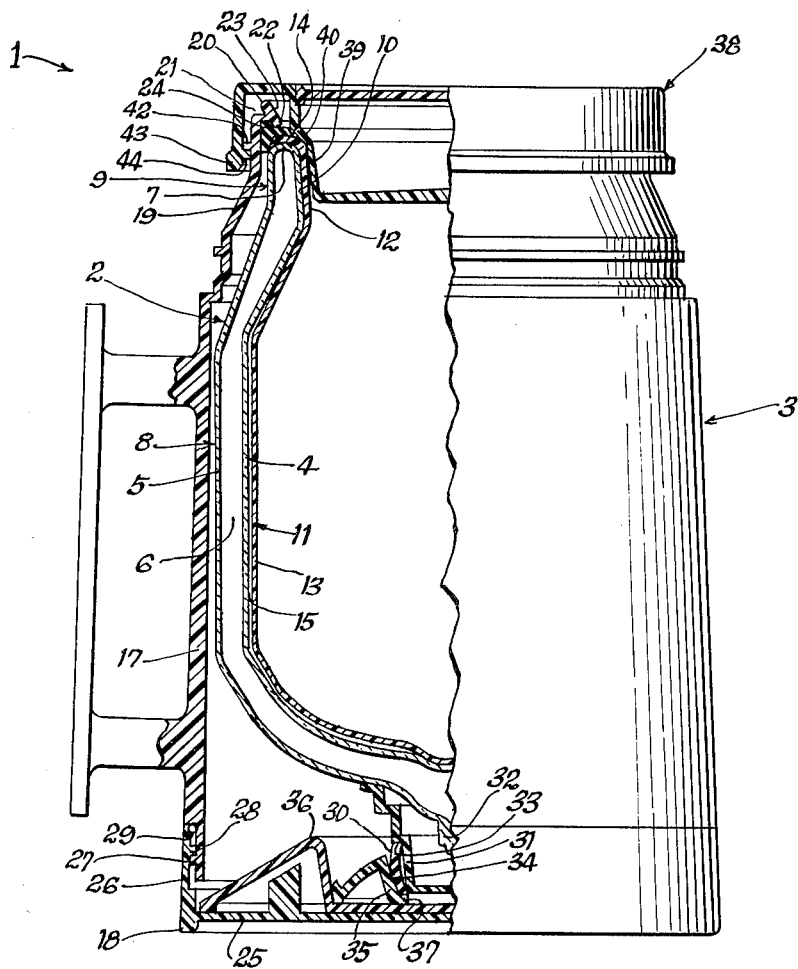
FIG. 3
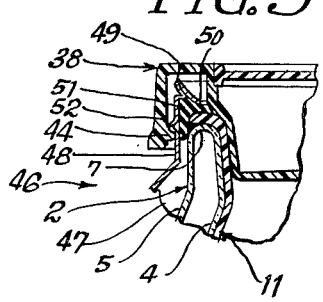
FIG. 2
INVENTOR
Robert M. Rownd
by McDougall, Hersh
and Scott
Attys June 28, 1966 R. M. ROWND 3,258,147
VACUUM BOTTLES HAVING FILLERS WITH PLASTIC LINERS
Filed Aug. 20, 1964 4 Sheets-Sheet 2
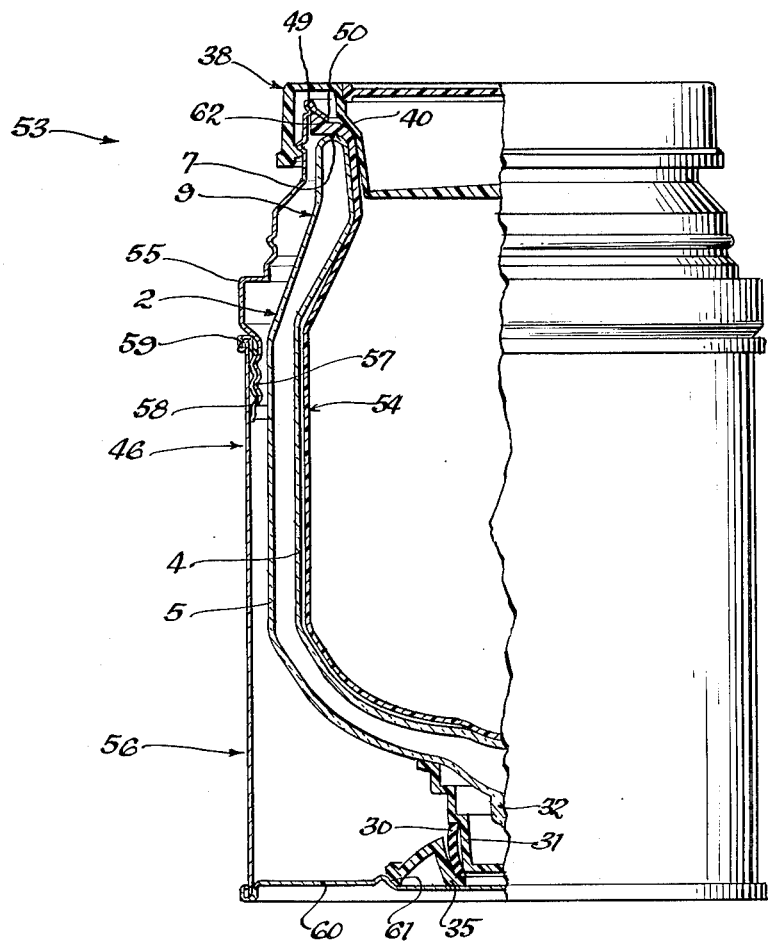
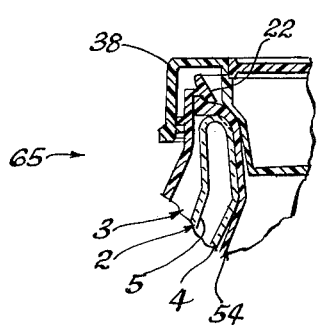
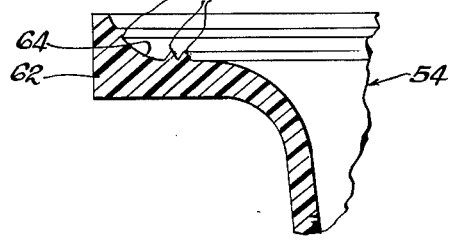

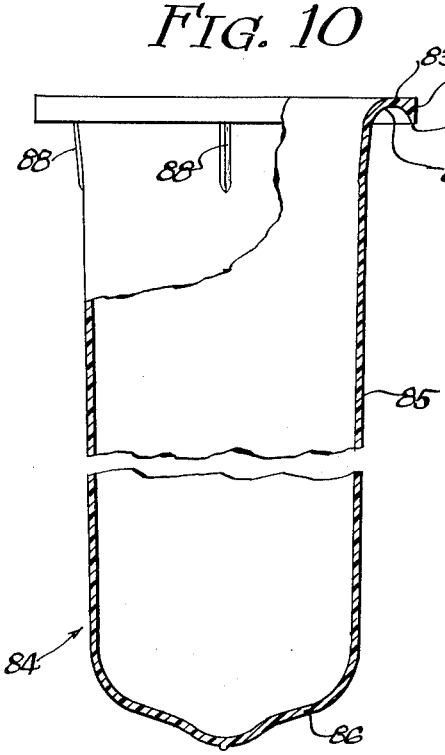
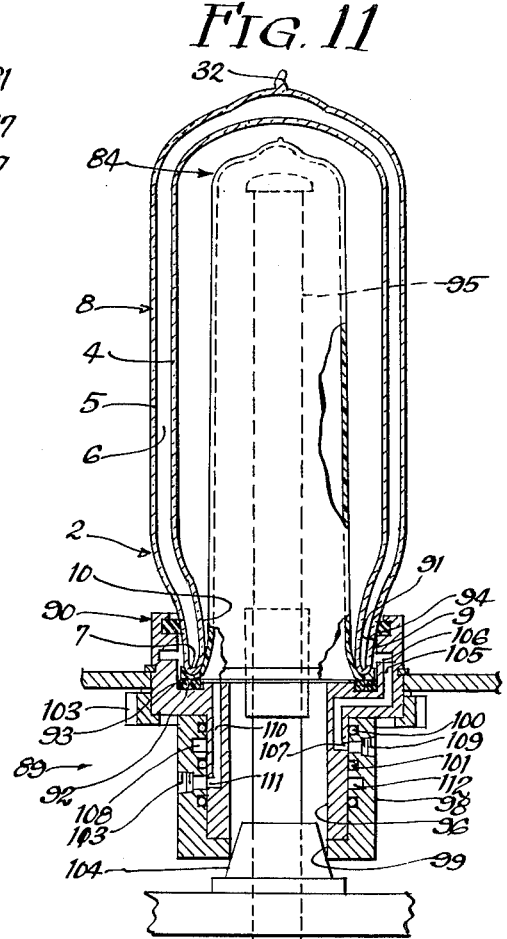
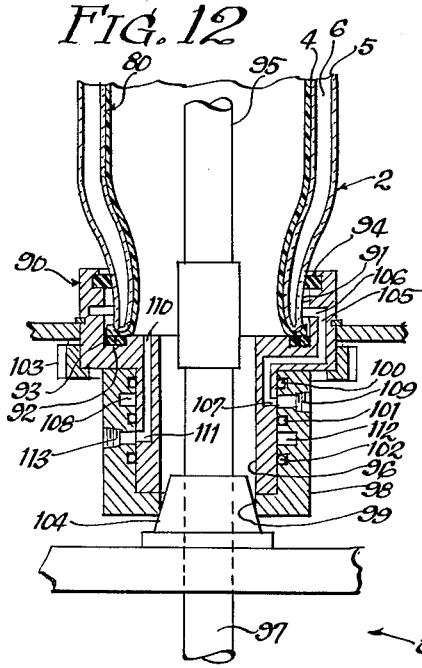
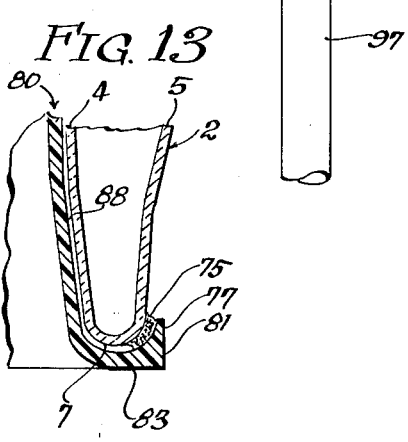

United States Patent Office 3,258,147
Patented June 28, 1966

3,258,147
VACUUM BOTTLES HAVING FILLERS WITH PLASTIC LINERS
Robert M. Rownd, Nashville, Tenn., assignor to Aladdin Industries, Incorporated, Chicago, Ill., a corporation of Illinois
Filed Aug. 20, 1964, Ser. No. 390,845
10 Claims. (Cl. 215—13)

This invention relates to vacuum bottles and also to vacuum insulated fillers for vacuum bottles.

One object of the present invention is to provide a new and improved vacuum bottle having a vacuum insulated filler having a narrow or constricted mouth or neck, the filler being provided with a plastic liner which is closely received therein and is held captive within the filler by the narrow mouth.

A further object is to provide such a new and improved vacuum bottle in which the plastic liner is expanded into the narrow mouth filler so that the liner conforms closely in shape to the filler and is formed with a body portion which is larger in diameter than the narrow mouth, so that the liner is securely retained within the filler.

A further object is to provide such a new and improved vacuum bottle in which the plastic liner prevents the filler from being broken, scratched or otherwise damaged.

Another object is to provide such a new and improved vacuum bottle in which the plastic liner protects the inside of the filler so that ice cubes, a spoon or other objects may be inserted or used in the filler without danger of breaking the filler.

It is a further object to provide a new and improved vacuum bottle in which means are provided to form a fluid-tight seal between the upper end of the plastic liner and the vacuum insulated filler or receptacle, so as to prevent any liquid from leaking into the space between the plastic liner and the inside of the filler.

A further object is to provide such a new and improved vacuum bottle in which the seal is formed by a body or mass of a sealant material disposed between the filler and the plastic liner.

Another object is to provide such a new and improved vacuum bottle in which the upper end of the plastic liner is formed with an annular cup or trough into which the sealant material may be poured, during the manufacture of the filler, when the filler is in an inverted position.

It is a further object to provide a new and improved vacuum bottle in which the upper end of the plastic liner is formed with an outwardly projecting annular sealing flange or gasket portion, adapted to be pressed into sealing engagement with the underside of an inwardly projecting flange on the protective jacket for the vacuum bottle.

A further object is to provide such a new and improved vacuum bottle in which one or more annular sealing ridges project upwardly from the sealing flange.

Another object is to provide a new and improved vacuum bottle in which the narrow mouth or neck of the plastic liner is formed with internal screw threads for mating with external threads on a closure or stopper.

Further objects and advantages of the present invention will appear from the following description, taken with the accompanying drawings, in which:

FIG. 1 is an elevational view, partly in longitudinal section, of a vacuum bottle to be described as an illustrative embodiment of the present invention.

FIG. 2 is a fragmentary enlarged sectional view corresponding to the upper left hand portion of FIG. 1.

FIG. 3 is a fragmentary sectional view similar to FIG. 2 but showing a modified construction.

FIG. 4 is a view similar to FIG. 1 but showing another modified vacuum bottle in which the upper end of the plastic liner is formed with a gasket or sealing portion.

FIG. 5 is a fragmentary enlarged sectional view of the sealing flange or gasket portion of the plastic liner as shown in FIG. 4.

FIG. 6 is a fragmentary sectional view similar to the upper left hand portion of FIG. 4 but showing a modified construction.

FIG. 10 is an elevational sectional view of a liner blank before it is expanded into a vacuum insulated filler to provide a construction corresponding to FIG. 9.

FIGS. 11 and 12 are diagrammatic elevational sectional views showing successive stages of a method of expanding the plastic liner blank into the vacuum insulated filler.

FIG. 13 is a fragmentary enlarged sectional view showing the addition of the sealant material between the liner and the filler.

Figure 7:
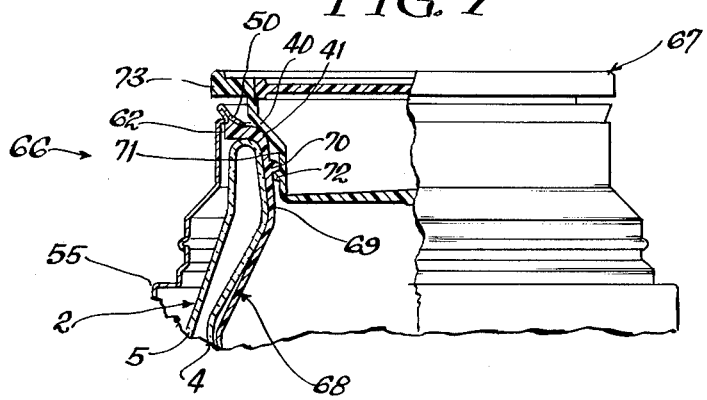
FIG. 7 is a fragmentary elevational sectional view showing another modified vacuum bottle in which the narrow mouth of the plastic liner is formed with screw threads to receive a stopper or closure.

As already indicated, FIG. 1 illustrates a vacuum bottle 1 having a vacuum insulated filler 2 which is enclosed within a protective jacket or casing 3. The filler 2 is in the form of a bottle-shaped receptacle which is normally made of glass and is formed with inner and outer walls 4 and 5. An evacuated space 6 is provided between the walls 4 and 5. The filler 2 has an upper rim portion 7 which extends between the inner and outer walls 4 and 5. The rim portion 7 is generally semi-circular in cross section and extends in the manner of an arch between the inner and outer walls 4 and 5.

The filler 2 has a body portion 8, which is generally cylindrical in shape, and an upper or neck portion 9 which is reduced in diameter, relative to the diameter of the body portion 8. A narrow or constricted mouth 10 is formed in the upper end of the inner wall 4. The inside diameter of the mouth 10 is substantially less than the inside diameter of the body portion 8.

In accordance with the present invention, the vacuum insulated filler 2 is equipped with a liner 11 which covers the entire inner surface of the inner wall 4, so as to protect the inner wall from being broken, scratched or otherwise damaged. The protection afforded by the liner wall 11 makes it possible to use a spoon, ice cubes or other implements or objects within the filler, without danger of breaking the inner wall.

The liner 11 is closely received within the inner wall 4. The shape of the liner conforms closely to the shape of the inner wall 4. Preferably, the liner 11 is made of a resinous plastic material which is odorless, tasteless, impervious to liquids and non-toxic. Polyethylene and polypropylene are examples of suitable plastic materials for use in the liner 11.

The liner 11 actually holds any liquid or solid materials which are placed in the vacuum bottle. Thus, the fragile glass filler 2 is protected from direct contact with such materials. The liner 11 protects the filler 2 from heat shock, so that extremely hot or cold liquids may be poured into the vacuum bottle without substantial danger of breaking the filler due to sudden or uneven expansion or contraction.

The plastic liner 11, like the glass inner wall 4, has a narrow or constricted mouth 12 and a body portion 13 of expanded or enlarged diameter. Thus, the liner 11 is held captive or retained within the inner wall 4 of the filler 2, due to the fact that the enlarged or expanded body portion 11 of the liner is too large to pass through the narrow mouth 10 of the inner wall 4. In the process of manufacturing the vacuum bottle, the liner 11 is normally expanded into the filler 2, as will be described in greater detail presently. A preferred method and apparatus for expanding the liner are disclosed and claimed in the copending application of Robert M. Rownd and Thomas H. Pettey, Serial No. 351,753 filed March 13, 1964, and entitled "Method of and Apparatus for Making Plastic Lined Vacuum Bottle Fillers."

As shown in FIGS. 1 and 2 the liner 11 has an upper annular flange portion 14 which curves outwardly over the arching rim portion 7 of the glass filler 2. Means are provided to form a fluid-tight seal between the flange 14 and the filler 2, so that liquids will be excluded from the narrow space 15 between the liner 11 and the inner wall 4 of the filler 2. As shown, the seal is formed by an annular body or mass of a sealant material 16, disposed between the outer edge of the flange 14 and the underlying portion of the glass filler 2. The sealant material 16 may comprise various adhesives or mastics. A great variety of such materials are available or known to those skilled in the art. For example, the sealant 16 may comprise an adhesive of the hot melt type, which softens or melts when heated. Many such adhesives are available to those skilled in the art. Alternatively, the sealant 16 may comprise an adhesive which hardens spontaneously, such as various silicone rubbers of the room temperature vulcanizing type. Adhesives may also be employed which are vulcanized or hardened by the application of heat.

It is extremely important to exclude all liquids from the space 15 between the liner 11 and the glass inner wall 4. Normally, the liner is transparent or translucent, so that an unsightly and unappetizing appearance will be produced by any liquid which may find its way into the space between the liner and the glass filler. Moreover, it is practically impossible to remove any liquid which may leak into this space. The provision of the sealant material 16 prevents any such leakage.

In the vacuum bottle 1 of FIG. 1 the protective jacket or casing 3 is made of a resinous plastic material and is formed in two principal parts, a body or upper portion 17 and a lower or bottom closure portion 18. The body 17 surrounds the body portion 8 of the filler 2 and is provided with a reduced upper or neck portion 19 which surrounds the neck portion 9 of the filler 2. A pouring lip or flange 20 is formed on the upper end of the neck portion 19. It will be seen that the pouring lip 20 projects upwardly and outwardly and is annular in shape. An undercut groove 21 is formed under the pouring lip 20 around the outside of the neck portion 19. The pouring lip or flange 20 has an inner annular portion 22 which projects inwardly over the upper end of the filler 2. Thus, the inwardly projecting flange 22 overhangs the flange 14 on the liner 11. The upper side of the pouring lip flange 20 is formed with an annular surface 23 which flares upwardly and outwardly. When liquids are poured from the vacuum bottle, the liquids pass over the flaring surface 23 and also over the pouring lip 20, which prevents the liquids from running down the outside of the vacuum bottle.

In the construction of FIG. 1, a soft, resilient gasket or sealing ring 24 is provided between the outwardly projecting flange 14 on the liner and the inwardly projecting flange 22 on the jacket 3. The gasket 24 may be made of various rubbery materials such as natural or synthetic rubber or various plastics. The gasket 24 prevents the leakage of liquids between the flange 14 on the liner and the flange 22 on the jacket. Thus, the gasket 24 excludes liquids from the space between the filler 2 and the jacket 3.

In this case the lower member or bottom closure 18 comprises a disc-shaped bottom wall 25 which is formed with a generally cylindrical outer flange 26. Mating screw threads 27 and 28 are formed on the body member 17 and the flange 26 for disengageably securing the bottom closure member 18 to the body member. The bottom closure member 18 may be unscrewed from the body member 17 when it is desired to remove or replace the filler 2. A sealing ring or gasket 29 may be provided between the flange 26 and the body member 17 to prevent the leakage of liquids into the jacket 3. As shown, the gasket 29 is in the form of an O-ring made of a rubbery material such as natural or synthetic rubber.

The lower end of the filler 2 may be supported in the manner disclosed and claimed in the Bramming Patent No. 2,963,187, patented December 6, 1960, and entitled "Filler Support for Vacuum Bottles." Thus, the lower end of the filler 2 is resiliently supported and pressed upwardly by a sleeve or tube 30 made of rubbery material, such as natural or synthetic rubber. The upper end of the sleeve 30 is received around a cup-shaped member 31 mounted on the lower end of the filler 2. As shown, the member 31 serves as a protective housing for the fragile tubulation 32 which projects downwardly from the filler 2 and is centrally disposed on the bottom of the outer wall 5. The tubulation 32 constitutes the remaining portion of the tube through which the filler was evacuated during the process of manufacture. The upper end of the resilient sleeve 30 engages a downwardly facing shoulder 33 on the cup-shaped member 31.

It will be seen that the lower portion of the resilient sleeve 30 is received in a socket 34 which is formed in a socket member 35. While the socket member 35 may be formed integrally with the bottom wall 25 it is shown as a separate piece which is supported by a circular insert 36 mounted on the bottom wall 25. The lower end of the resilient sleeve 30 is supported by a shoulder 37 formed on the socket member 35.

The tightening of the bottom closure 18 compresses the resilient sleeve 30 and causes it to press the filler 2 upwardly into firm sealing engagement with the gasket 24 at the upper end of the filler. Thus, a tight seal is produced between the gasket 24 and the flange 14 on the upper end of the plastic liner 11. The flange 14 is smooth and regular in shape so that a tight seal is readily maintained. The formation of the seal between the gasket and the plastic flange 14 is a great improvement over the usual situation in which the gasket engages the glass filler, because glass fillers often have minor irregularities which make it difficult to produce a good seal.

The vacuum bottle of FIGS. 1 and 2 is provided with a closure or stopper 38 adapted to close the mouth 12 of the plastic liner 11. The closure 38 is preferably made of a resinous plastic material. As shown, the closure 38 comprises a hollow, generally cup-shaped stopper member 39 which fits snugly within the mouth 12 and is adapted to form a seal therewith. The hollow stopper member 39 is thin walled and is sufficiently resilient and flexible to form a good seal with the mouth 12.

To provide added assurance of a good seal, the upper portion of the stopper member 39 is formed with an annular shoulder 40 which faces downwardly and is frustoconical in shape. The downwardly tapering shoulder 40 is adapted to seat against the upper flange portion 14 of the liner 11. More specifically, the flange 14 has a curved inner portion 41 against which the shoulder 40 is adapted to seat. The curved portion 41 is smooth and regular in shape so that a good seal is readily produced between the tapering shoulder 40 and the liner. Here again, it is much easier to produce a good seal than in the usual type of vacuum bottle construction, in which the shoulder portion on the stopper engages the glass filler, because the glass filler is likely to have surface irregularities which will interfere with the production of a good seal.

In the vacuum bottle of FIGS. 1 and 2, the closure 38 is adapted to be screwed on to the neck portion 19 of the protective jacket 3. Thus, external screw threads 42 are formed on the neck portion 19. The closure 38 has a downwardly projecting outer flange or ring 43 which is formed with internal screw threads 44, adapted to mate with the threads 42. The flange or mounting ring 43 may be formed integrally with the stopper member 39. The upper end of the hollow stopper member 39 may be closed by a disc 45 which may be made of a resinous plastic material.

By screwing down the closure 38, the tapering shoulder 40 may be pressed firmly against the rounded annular seat 41 on the liner 11. Thus, a fluid-tight seal is assured between the closure and the liner.

In the construction of FIGS. 1 and 2, the protective jacket 3 is made entirely of resinous plastic materials. FIG. 3 illustrates a modified vacuum bottle 46 which has a protective jacket 47 made of metal. The jacket 47 has a neck or upper portion 48 which is formed with an annular pouring lip 49. A flange 50 projects inwardly and downwardly from the pouring lip 49 so as to overhang the flange 14 on the liner 11. A rubber gasket or sealing ring 51 is provided between the flanges 14 and 50 so as to prevent leakage of liquids between the filler 2 and the jacket 47. The filler 2, the liner 11 and the closure 38 are the same as in the construction of FIGS. 1 and 2. External screw threads 52 are formed on the sheet metal neck portion 48 to mate with the threads 44 on the closure 38.

FIG. 4 illustrates another modified vacuum bottle 53 which employs the same vacuum insulated filler 2 as illustrated in FIGS. 1 and 2, but employs a somewhat modified liner 54. The vacuum bottle 53 of FIG. 4 may employ the same sheet metal jacket 46 as illustrated in FIG. 3, but additional details of the jacket are shown in FIG. 4. It will be seen that the jacket 46 comprises an upper member or collar 55 and a lower member or canister 56. Mating screw threads 57 and 58 are provided between the collar 55 and the canister 56 so that these parts may be screwed together. The screw threads 57 are formed on the lower portion of the collar 55 while the threads 58 are formed on a bushing 59 which is secured within the upper end of the canister 56. It will be seen that the canister has a bottom wall 60. The arrangements for supporting the filler 2 may be the same as illustrated in FIG. 1. The socket member 35 is mounted in a central recess or seat 61 formed on the bottom wall 60.

The plastic liner 54 is the same as the liner 11 of FIGS. 1 and 2, except that the upper flange 14 is replaced with a modified flange 62 which serves as a gasket or sealing member, so that it is possible to dispense with the separate rubber gasket 24 of FIGS. 1 and 2. Thus, the flange 62 directly engages the underside of the inwardly projecting flange 50 on the jacket 46. It will be seen that the flange 62 projects outwardly beyond the arching rim 7 of the filler 2 so that an added amount of flexibility is imparted to the flange 62. Thus, the flange 62 is able to flex sufficiently to form a good seal with the metal flange 50.

It is preferred to provide additional sealing elements on the flange 62. Thus, the flange 62 may be formed with one or more upwardly projecting annular ridges adapted to engage the underside of the metal flange 50 on the collar 55. As shown to best advantage in FIG. 5, the illustrated flange 62 has three such sealing ridges 63 which project upwardly from a curved surface 64 on the upper side of the flange. The curved surface 64 corresponds in shape to the underside of the metal flange 50. The three ridges 63 engage the metal flange 50 at three successive points to provide successive seals. Each of the ridges 63 is sharply pointed and has a cross-sectional shape corresponding to an inverted V. The sealing pressure between the flanges 50 and 62 is concentrated at the ridges 63 so as to insure that a good seal will be produced. As previously indicated, the liner 54 may be made of plastic materials such as polyethylene and polypropylene. These materials are relatively soft and flexible. These properties are conducive to the production of a good seal between the ridges 63 and the metal flange.

FIG. 6 illustrates another modified vacuum bottle 65 which is the same as illustrated in FIG. 4 except that the metal jacket 46 of FIG. 4 is replaced with the plastic jacket 3 of FIGS. 1 and 2. The ridges 63 on the sealing flange 62 engage the underside of the flange 22 on the plastic jacket 3, so as to form a fluid-tight seal between the liner 54 and the jacket 3.

Still another modified vacuum bottle 66 is shown on FIG. 7. The vacuum bottle 66 is very much the same as the vacuum bottle 53 of FIG. 4, except that the closure 38 is replaced with a closure 67 which screws into the mouth of the plastic liner, rather than screwing on to the jacket. Thus, the vacuum bottle 66 is provided with a slightly modified liner 68 having a constricted or narrow mouth portion 69 which is formed with integral internal threads 70. Otherwise, the liner 68 is the same as the liner 54 of FIG. 4.

The closure 67 has a hollow stopper portion 71 which is formed with external screw threads 72, adapted to mate with the threads 70. Otherwise, the stopper portion 71 is substantially the same as the stopper portion 39 as illustrated in FIGS. 1 and 2. The closure 67 has an outwardly projecting flange 73 at the upper end of the stopper portion 71. The flange 73 replaces the mounting ring 42 and serves as a handgrip. The other details of the closure 67 are the same as illustrated in FIGS. 1 and 2. As before, the downwardly tapering shoulder 40 seats against the rounded inner portion 41 on the liner 68. The closure 67 may be screwed down tightly to develop a firm sealing engagement between the tapered shoulder 40 and the rounded seat 41.

The construction shown in FIG. 7 has the advantage that the tightening of the closure 67 does not tend to push the filler 2 downwardly. Thus, there is no tendency for the tightening of the closure to unseat the sealing flange 62 from the inwardly projecting flange 50 on the collar 55. Accordingly, the tightening of the closure 67 does not disturb the seal between the liner 68 and the flange 50.

Figure 8:
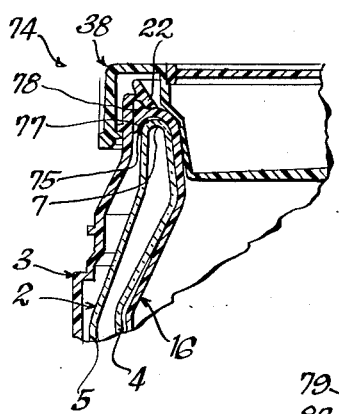
FIG. 8 is a fragmentary sectional view similar to FIG. 6 but showing a modified construction in which the upper end of the plastic liner is formed with a cup or trough for receiving a sealant material.

FIG. 8 illustrates a modified vacuum bottle 74 which is the same as the vacuum bottle 65 of FIG. 6, except that an annular body or mass of sealant material 75 is provided between the plastic liner 76 and the glass filler 2. The liner 76 is similar to the liner 54 of FIG. 6, but is provided with an annular cup or trough 77 to hold the sealant material 75. The liner 76 has its upper portion formed into an outwardly projecting flange 78 which is the same as sealing flange 62, except that the sealant retaining cup or trough 77 projects downwardly from the outer portion of the flange 78. The sealant material 75 is received in the space between the annular cup 77 and the rounded upper rim 7 of the filler 2. It will be seen that the cup 77 is in the form of a flange which is spaced outwardly a short distance from the curved rim 7. In other respects, the vacuum bottle 74 of FIG. 8 is the same as the vacuum bottle 65 of FIG. 6.

The cup or trough 77 facilitates the manufacture of the vacuum bottle, in that the sealant material 75 may readily be poured into the space between the cup 77 and the rounded rim 7, while the filler 2 is in an inverted position. The sealant material 75 flows by gravity into the space between the cup 77 and the filler 2 and is retained by the cup. As previously indicated, the sealant material 75 may take the form of a hot melt adhesive and may be in the melted or liquid state when poured into the cup 77. Alternatively, the sealant may be in the form of an adhesive which is initially in a liquid state but is adapted to be hardened by spontaneous vulcanization or by the application of heat.

Figure 9:
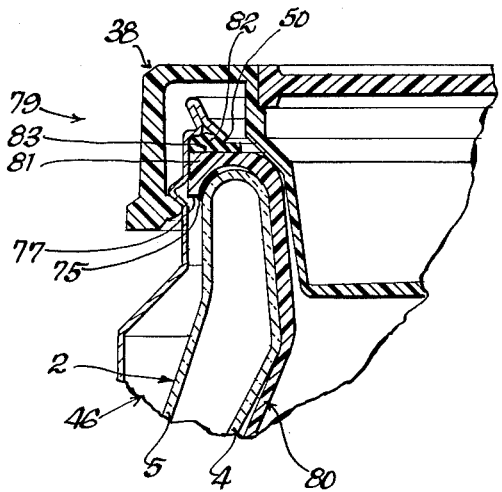
FIG. 9 is a fragmentary enlarged sectional view similar to FIG. 8 but showing a modified construction utilizing a separate gasket or sealing ring.

FIG. 9 illustrates still another vacuum bottle 79 which is similar in many respects to the vacuum bottle 74 of FIG. 8. However, the vacuum bottle 79 employs the metal jacket 46 of FIGS. 3 and 4, rather than the plastic jacket 3 shown in FIG. 8. The vacuum bottle 79 also employs a modified liner 80 having its upper portion formed into an outwardly projecting flange 81. A separate gasket or sealing ring 82 is provided between the flange 81 and the metal flange 50 on the jacket 46. In this respect, the vacuum bottle 79 of FIG. 9 differs from the vacuum bottle 74 of FIG. 8. It will be seen that the flange 81 has a substantially horizontal upper surface 83 which engages the underside of the gasket 82 and is in sealing engagement therewith. The flange 81 is provided with the sealant retaining cup or trough 77, as previously described. Thus, the sealant material 75 may be poured between the cup 77 and the filler 2, while the filler is in an inverted position.

As already indicated, the copending application of Robert M. Rownd and Thomas H. Petty, Serial No. 351,753 filed March 13, 1964, discloses and claims a preferred method of and apparatus for making the plastic lined vacuum bottle fillers of the general construction illustrated in FIGS. 1–9 of the present application. The method and apparatus of the copending application are particularly applicable to the production of a plastic lined filler having a narrow or constricted mouth, so that the liner is held captive in the filler. It may be helpful to summarize briefly in this application the manner in which the plastic lined filler is preferably produced.

Thus, the preferred method of and apparatus for making the plastic lined filler are illustrated in FIGS. 10–13. FIGS. 12 and 13 illustrate the completed plastic liner, which is the same in construction as the liner 80 of FIG. 9 and is so designated in FIGS. 12 and 13. The vacuum insulated filler of FIGS. 11, 12, and 13 is the same as the filler 2 of FIG. 1 and is so designated.

In general, the plastic liner 80 is formed initially as a blank 84 which is small enough to be slipped into the filler 2 through the narrow mouth 10. The plastic blank 84 is then expanded until it fits closely within the inner wall 4 of the filler 2. The expanded blank then constitutes the liner 80 and is held captive within the filler 2.

As illustrated in FIG. 10, the liner blank 84 has a side wall 85 and a bottom wall 86. The side wall 85 is generally cylindrical in shape, but tapers downwardly to some extent. The blank 84 may be formed by injection molding or by any other known or suitable method of forming plastic materials. The downward taper of the side wall 85 facilitates the removal of the blank 84 from the mold in which it is formed. As already indicated, the blank 84 may be made of various suitable plastic materials, such as polypropylene or polyethylene, for example.

The upper end of the blank 84 is formed with an outwardly projecting flange which is the same as the flange 81 of FIG. 9 and is so designated. The flange 81 has a curved lower surface 87 which is adapted to engage the curved rim portion or the upper wall 7 of the filler 2. To provide for the flow of air out of the space between the blank 84 and the filler 2, ribs or ridges 88 are formed on the curved surface 87. The ridges 88 also extend downwardly along the upper portion of the side wall 85. The ribs effectively form channels for the passage of air between the flange 81 and the upper end of the filler 2.

In the manufacture of the plastic lined filler, the liner blank 84 is slipped into the filler 2 until the upper wall or rim portion 7 of the filler engages the flange 81. The space between the outside of the liner blank 84 and the inside of the filler 2 is then evacuated so that there will be no air in this space to form bubbles or air pockets when the liner blank is expanded into the filler. In order to make it possible to expand the liner blank 84 by a blowing operation, the liner blank is heated until it is softened to a consistency suitable for blowing. To prevent premature expansion of the liner blank 84 by atmospheric pressure within the liner blank, the space within the liner blank is preferably evacuated before the liner blank has been heated sufficiently to soften it to any substantial extent.

When the liner blank has been softened to the desired consistency for blowing, fluid pressure is applied to the inside of the liner blank so as to blow the liner blank outwardly into close proximity to the entire inside of the filler 2. Most conveniently, the fluid pressure is applied to the inside of the liner blank simply by admitting atmospheric pressure thereto. The vacuum between the liner blank 84 and the inside of the filler 2 is maintained so that the atmospheric pressure within the liner will expand the liner into engagement with the inside of the filler.

The expanded liner blank constitutes the liner 80 and is cooled until it is hard enough to hold its new shape. The vacuum between the liner and the filler is then vented. The sealing compound 75 is then poured into the space between the cup or flange 77 and the filler 2, as previously described.

FIGS. 11 and 12 constitute diagrammatic illustrations of the apparatus or machine 89 for expanding the liner blank 84. The illustrated machine 89 is provided with a rotary holder or head 90 having an upwardly opening bore 91 into which the liner blank 84 may be inserted in an inverted position, as shown in FIG. 11. The head 90 is formed with a shoulder 92 at the lower end of the bore 91 to support the flange 81 of the liner blank. The shoulder 92 may be provided with one or more sealing rings 93 to form a seal between the flange 81 and the head.

The filler 2 is then slipped over the liner blank 84 and into the bore 91. Another sealing ring 94 is provided in the head 90 to form a seal between the neck portion 9 of the filler and the inside of the bore 91.

The machine 89 is provided with a heater 95 for heating the plastic liner blank 84. The heater 95 is adapted to be moved upwardly through the head 90 and into the liner blank 84. The heater 95 is movable through a bore 96 connecting with the lower end of the bore 91. The heater 95 preferably takes the form of an elongated heater element which is electrically energized. As shown, the heater 95 is mounted on the upper end of a rod or plunger 97 which is adapted to be raised and lowered by suitable means.

The illustrated head 90 is rotatably mounted in a cup-shaped bearing or sleeve 98 having a bore 99 therein aligned with the bore 96. Sealing rings 100, 101 and 102 may be provided between the bearing 98 and the head 90. A gear 103 is mounted on the head 90 and is adapted to mesh with a suitable drive gear.

When the heater 95 is moved upwardly into the liner blank 84 through the bores 99, 96 and 91, the bore 99 is closed and sealed by a plug or stopper 104 which is mounted on the shaft or rod 97. Thus, the space within the liner blank 84 and the head 90 is closed off from the atmosphere.

The machine 89 is arranged to provide for evacuation of the space between the outside of the liner blank 84 and the inside of the filler 2. Provision is also made for separately evacuating the space within the liner blank 84. As shown in FIGS. 11 and 12, a passage 105 is formed in the head 90 to provide for the evacuation of the space between the liner blank 84 and the filler 2. One end of the passage 105 connects with an annular groove or port 106 which is formed in the inside of the head 90 opposite the position normally occupied by the neck portion 9 of the filler 2. The groove 106 communicates with the space between the sealing rings 93 and 94. Thus, the groove 106 is in communication with the joint or opening between the rounded rim or edge portion 7 of the filler 2 and the flange 81 on the liner blank 84.

It will be seen that the passage 105 extends downwardly within the head 90 and communicates at its lower end with an outwardly directed port 107 in the cylindrical lower portion of the head 90. The port 107 registers with an annular groove 108 which is formed in the internal cylindrical surface of the bearing 98. The groove 108 communicates with a threaded opening or port 109 in the bearing 98. When it is desired to evacuate the space between the liner blank 84 and the inside of the filler 2, the port 109 is connected to a suitable vacuum pump.

The head 90 is formed with another passage 110 to provide for evacuation of the space within the liner blank 84. One end of the passage 110 communicates with the space within the head 90 and thus is in communication with the interior of the liner blank 84. At its opposite end, the passage 110 communicates with an outwardly directed port 111 which registers with an annular groove 112 within the bearing 98. The groove 112 communicates with another threaded opening or port 113 in the bearing 98. When it is desired to evacuate the space within the liner blank 84, the port 113 is connected to a suitable vacuum pump.

In the operation of the machine 89, the liner blank 84 and the filler 2 are mounted on the head 90 as shown in FIG. 11. A vacuum pump is connected to the port 109 so as to evacuate the space between the liner blank 84 and the inner wall 4 of the filler 2.

The heater 95 is moved upwardly into the liner blank 84. The upward movement of the heater also moves the plug 104 upwardly so as to close the bore 99. The interior of the liner blank 84 is then evacuated through the port 113. Next, the heater 95 is energized so as to heat the liner blank 84 until it is softened to a blowing consistency. During the heating operation, the head 90 is rotated so that the liner blank will be uniformly heated. The provision of the vacuum within the liner blank 84 prevents immediate or premature expansion of the liner blank. If the liner blank is expanded too soon, it is likely to be expanded in an irregular manner due to minor irregularities in the heating of the liner blank 84. When the liner blank 84 has been thoroughly heated, atmospheric pressure is admitted to the inside of the liner blank by venting the port 113 to the atmosphere. The pressure within the liner blank 84 causes it to expand into close contact with the inner wall 4 of the filler 2. The vacuum between the liner blank 84 and the filler 2 is maintained so that there will be no air bubbles or other similar imperfections in the expanded liner blank.

The heater 95 is withdrawn from the expanded liner, and the liner is allowed to cool so that it will harden. Thereafter, the liner is retained or held captive within the vacuum insulated filler 2. The port 109 is then vented to the atmosphere, so that the vacuum will no longer be maintained between the liner and the filler. The plastic lined filler may then be removed from the machine.

The filler is completed by pouring or forcing the sealing compound 75 into the space or gap between the annular cup 77 and the rim portion 7 of the filler. The sealing compound 75 prevents any liquids from entering the space between the filler and the plastic liner 80.

The narrow mouthed filler of the present invention has the advantage of positively retaining the expanded plastic liner. Moreover, the narrow mouthed filler affords better heat insulation than a filler with a wider mouth. The narrow mouth is also easier to close tightly than a wider mouth.

The plastic liner within the filler protects the fragile filler from being broken, scratched or otherwise damaged. Thus, a spoon, ice cubes or other objects may be used in the filler without danger of breaking it. The plastic liner also protects the filler against breakage due to heat shock.

Thus, the provision of the plastic liner within the narrow mouthed filler greatly increases its versatility and usefulness, while making the filler much more durable and resistant to breakage. Moreover, the provision of the plastic liner adds very little to the cost of the filler.

Various other modifications, alternative constructions and equivalents may be employed without departing from the true spirit and scope of the invention, as exemplified in the foregoing description and defined in the following claims.

I claim:

1. In a filler for vacuum bottles, the combination comprising a vacuum insulated receptacle made of glass and having inner and outer walls with an evacuated space therebetween, said receptacle having an upper rim portion extending between said inner and outer walls, an impervious liner made of resinous plastic material and closely received within said inner wall, said liner having an upper annular portion of an inverted trough shape extending over and covering said upper rim portion of said receptacle, and an annular body of a sealant material disposed between said receptacle and said upper annular portion of said liner to form a fluid-tight seal therebetween, said upper annular portion of said liner having an outer margin which is spaced outwardly from said receptacle to form an annular gap therebetween for receiving said body of sealant material.

2. In a vacuum bottle, the combination comprising a vacuum insulated receptacle having inner and outer glass walls with an evacuated space therebetween, said receptacle having an upper annular rim portion extending between said inner and outer walls, a protective jacket received around said receptacle and covering the entire outside thereof, an impervious liner made of resinous plastic material and closely received within said inner wall, said liner covering the entire inner surface of said inner wall and conforming closely to the shape thereof, said liner having an upper annular gasket flange portion formed integrally therewith and projecting above said rim portion of said receptacle, and an inwardly projecting annular flange on the upper end of said jacket and engaging the upper side of said sealing flange on said liner to form a fluid-tight seal between said liner and said jacket, said flange having an upwardly projecting annular sealing ridge thereon engageable with said inwardly projecting flange on said jacket.

3. In a vacuum bottle, the combination comprising a vacuum insulated receptacle having inner and outer walls with an evacuated space therebetween, said receptacle having an upper rim portion extending between said inner and outer walls, a protective jacket received around said receptacle and covering the entire outside thereof, an impervious liner made of plastic material and closely received within said inner wall, said liner covering the entire inner surface of said inner wall and conforming closely to the shape thereof, said liner having an upper annular sealing flange formed integrally therewith and projecting outwardly over said upper rim portion of said receptacle, and an inwardly projecting annular flange on the upper end of said jacket and engaging the upper side of said sealing flange on said liner to form a fluid-tight seal between said liner and said jacket.

4. In a vacuum bottle, the combination comprising a vacuum insulated receptacle having inner and outer walls with an evacuated space therebetween, said receptacle having an upper rim portion extending between said inner and outer walls, a protective jacket received around said receptacle and covering the entire outside thereof, an impervious liner made of plastic material and closely received within said inner wall, said liner covering the entire inner surface of said inner wall and conforming closely to the shape thereof, said liner having an upper annular sealing flange formed integrally therewith and projecting outwardly over said upper rim portion of said receptacle, and an inwardly projecting annular flange on the upper end of said jacket and engaging the upper side of said sealing flange on said liner to form a fluid-tight seal between said liner and said jacket, said sealing flange on said liner having an upwardly projecting annular sealing ridge engageable with said inwardly projecting flange on said jacket.

5. In a filler for vacuum bottles, the combination comprising a vacuum insulated receptacle having inner and outer walls with an evacuated space therebetween, said receptacle having an upper rim portion extending between said inner and outer walls, a liner made of plastic material and closely received within said inner wall, said liner having an outwardly projecting annular flange formed integrally with the upper end of said liner and projecting outwardly therefrom over said rim portion of said receptacle, the outer portion of said flange having a downwardly projecting annular lip spaced outwardly from said rim portion of said receptacle to form an annular gap therebetween, and an annular mass of an adhesive sealing filler material disposed in said gap between said lip and said rim portion to form a fluid-tight seal therebetween.

6. In a vacuum bottle, the combination comprising a vacuum insulated receptacle having inner and outer walls with an evacuated space therebetween, said receptacle having an upper rim portion extending between said inner and outer walls, a protective jacket received around said receptacle and covering the entire outside thereof, an impervious liner made of plastic material and closely received within said inner wall, said liner covering the entire inner surface of said inner wall and conforming closely to the shape thereof, said liner having an upper annular sealing flange formed integrally therewith and projecting outwardly over said upper rim portion of said receptacle, an inwardly projecting annular flange on the upper end of said jacket, and a sealing ring compressed between said annular flange on said jacket and the upper side of said sealing flange on said liner to form a fluid-tight seal between said liner and said jacket.

7. A vacuum bottle, comprising the combination of a vacuum insulated receptacle having inner and outer walls with an evacuated space therebetween, said receptacle having an upper annular rim portion extending between said inner and outer walls, a protective jacket received around said receptacle and covering substantially the entire outside thereof, a liner made of plastic material and closely received within said inner wall of said receptacle, said liner covering the entire surface of said inner wall and conforming closely to the shape thereof, said liner terminating in an upper annular gasket flange formed integrally with the upper end of said liner and projecting outwardly over said rim portion of said receptacle, said gasket flange having an outer annular terminal portion which is spaced away from said receptacle and is flexible relative thereto, and an inwardly projecting annular flange on the upper end of said jacket and engaging the upper side of said annular terminal portion of said gasket flange to form a fluid-tight seal between said liner and said jacket.

8. A vacuum bottle, comprising the combination of a vacuum insulated receptacle having inner and outer walls with an evacuated space therebetween, said receptacle having an upper annular rim portion extending between said inner and outer walls, a protective jacket received around said receptacle and covering substantially the entire outside thereof, a liner made of plastic material and closely received within said inner wall of said receptacle, said liner covering the entire surface of said inner wall and conforming closely to the shape thereof, said liner terminating in an upper annular gasket flange formed integrally with the upper end of said liner and projecting outwardly over said rim portion of said receptacle, said gasket flange having an outer annular terminal portion which is spaced away from said receptacle and is flexible relative thereto, and an inwardly projecting annular flange on the upper end of said jacket and engaging the upper side of said annular terminal portion of said gasket flange to form a fluid-tight seal between said liner and said jacket, said gasket flange having an upwardly projecting annular sealing ridge thereon engageable with said inwardly projecting flange on said jacket.

9. A filler for vacuum bottles, comprising the combination of a vacuum insulated receptacle having inner and outer walls with an evacuated space therebetween, said receptacle having an upper annular rim portion extending between said inner and outer walls, and a liner made of plastic material and closely received within said inner wall, said liner covering the entire inner surface of said inner wall and conforming closely to the shape thereof, said liner terminating in an annular substantially horizontal gasket flange formed integrally with the upper end of said liner and projecting outwardly over said upper rim portion of said receptacle, said gasket flange having an outer annular terminal portion spaced above said rim portion of said receptacle and resiliently flexible relative thereto.

10. In a vacuum bottle, the combination comprising a vacuum insulated receptacle having inner and outer walls with an evacuated space therebetween, said receptacle having an upper rim portion extending between said inner and outer walls, a protective jacket received around said receptacle and enclosing substantially the entire outside thereof, a liner made of plastic material and closely received within said inner wall of said receptacle, said liner terminating in an outwardly projecting annular flange formed integrally with the upper end of said liner and projecting outwardly therefrom over said rim portion of said receptacle, said flange having an outer annular terminal edge portion overhanging said receptacle, an annular mass of an adhesive sealing compound disposed between said receptacle and said outer annular terminal edge portion to form a fluid-tight seal therebetween, and an inwardly projecting annular flange on the upper end of said jacket and in sealing engagement with the upper side of said outwardly projecting flange on said liner to form a fluid-tight seal between said liner and said jacket.

References Cited by the Examiner

UNITED STATES PATENTS

| | | | |
|---|---|---|---|
| 1,448,996 | 3/1923 | Donath | 215—13 |
| 2,643,021 | 6/1953 | Freedman | 215—13 |
| 3,016,159 | 1/1962 | Bramming | 215—13 |
| 3,094,448 | 6/1963 | Cornelius | 215—13 |

JOSEPH R. LECLAIR, *Primary Examiner.*

R. PESHOCK, *Assistant Examiner.*